United States Patent [19]

Balevski et al.

[11] 4,090,837
[45] May 23, 1978

[54] MACHINE FOR MOLDING MATERIALS WITH A LONG SOLIDIFICATION TIME, SUCH AS STRUCTURAL FOAMS

[75] Inventors: Angel Tonchev Balevski; Ivan Dimov Nikolov; Dragan Iliev Nenov, all of Sofia, Bulgaria

[73] Assignee: Institute po Metaloznanie i Technologia na Metalite, Sofia, Bulgaria

[21] Appl. No.: 760,503

[22] Filed: Jan. 19, 1977

[51] Int. Cl.² .............................................. B29F 1/022
[52] U.S. Cl. ................................... 425/588; 249/162; 425/589; 425/595
[58] Field of Search ............. 425/250, 247, DIG. 221, 425/DIG. 220, 450.1, 451.9, 234, 242, 589, 595, 588, 542; 249/162, 161, 160

[56] References Cited

U.S. PATENT DOCUMENTS

| 869,828 | 10/1907 | Cordes | 249/162 |
|---|---|---|---|
| 2,292,593 | 8/1942 | Amigo | 425/250 X |
| 3,015,849 | 1/1962 | Mettelstadt et al. | 425/247 |
| 3,647,338 | 3/1972 | Ise | 425/247 |
| 3,669,601 | 6/1972 | Cainesse | 425/234 X |
| 3,707,342 | 12/1972 | Lohmann | 425/450.1 X |
| 3,743,469 | 7/1973 | Gibbons | 425/DIG. 221 X |
| 3,880,565 | 4/1975 | Barr et al. | 425/450.1 |

FOREIGN PATENT DOCUMENTS

| 436,304 | 8/1968 | Japan | 425/450.1 |

*Primary Examiner*—Francis S. Husar
*Assistant Examiner*—William R. Briggs
*Attorney, Agent, or Firm*—Karl F. Ross

[57] ABSTRACT

An injection molding machine in which a support on a base carries oppositely facing stationary mold portions which, when joined by movable mold portions, form a pair of mold cavities, one of which can be injected with a moldable material having a long solidification time, while the other contains a previously injected article which is solidifying and can be released as soon as the injection of the first cavity is completed. One of the movable mold portions is connected to a movable plate in a fixed spaced relationship, with a wedge-type locking mechanism between the plate and the other movable mold portion for the locking of both mold cavities simultaneously with a single locking mechanism.

5 Claims, 2 Drawing Figures

MACHINE FOR MOLDING MATERIALS WITH A LONG SOLIDIFICATION TIME, SUCH AS STRUCTURAL FOAMS

FIELD OF THE INVENTION

This invention relates to a two-station machine for molding materials with a long solidification, such as structural foams.

BACKGROUND OF THE INVENTION

There are known in the art multi-station time molding machine the linear or rotary type, in which one plasticating screw barrel feeds two or more injection molds.

The drawback of the linear-type machines is the necessity for each station to be provided with a clamping device, which is one of the most heavy and complex units of the machine. The rotary-type machines comprise a complex and heavy unit, also, i.e. a rotating dividing table and, in addition, they are not adapted for molding large-sized parts.

There are further known two-station machines with one screw barrel and clamping unit, but they have the substantial drawback, in that the screw barrel is movable and follows the motion of the opening mold halves, while the individual opening of the molds requires a hydraulic device, which operates with a complex hydraulic system comprising several pressure steps.

A basic drawback of all molding machines for the processing of slowly solidifying materials is that the whole machine is standing idle until the material injected into the mold cools and solidifyies. This drawback is particularly striking in the production of structural foam parts, which are usually thick-walled. Their heat-conductivity is impaired because of their cellular core structure and the heat-retaining gas inside the cells, the mold having to remain closed until the formation of a compact skin of sufficient rigidity to allow the part to be removed without a deformation thereof.

OBJECT OF THE INVENTION

It is therefore a general object of the present invention to avoid the aforementioned drawbacks of the known molding machines by providing a compact two-station molding machine in which one clamping mechanism locks simultaneously both injection molds during the time of the filling of one of them, unlocking during the remaining time, allowing the injection molds to be opened closed or, respectively, only one of them remaining closed for the time necessary for the solidification of the molded part, and to remain closed only under the action of the light and simple mechanism for opening and closing the injection molds.

SUMMARY OF THE INVENTION

In accordance with the invention, this object is achieved in a molding machine in which a feed screw barrel is connected through a feeding conduit to two injection cylinders — one for each injection mold, and the whole feeding unit is disposed between two fixed plates, to which the fixed mold halves are guided by and which are guided by the body of the machine, while the locking mechanism is disposed between one of the movable plates and a supporting plate, which by means of rods is rigidly fastened to the other movable plate and together with it is movably guided along the base of the machine.

BRIEF DESCRIPTION OF THE DRAWING

For a better understanding of the invention, its operating advantages and specific objects attained by its use, reference should be made to the accompanying drawing in which there is illustrated and described a preferred embodiment of the invention, in which.

SPECIFIC DESCRIPTION

Figure 1:
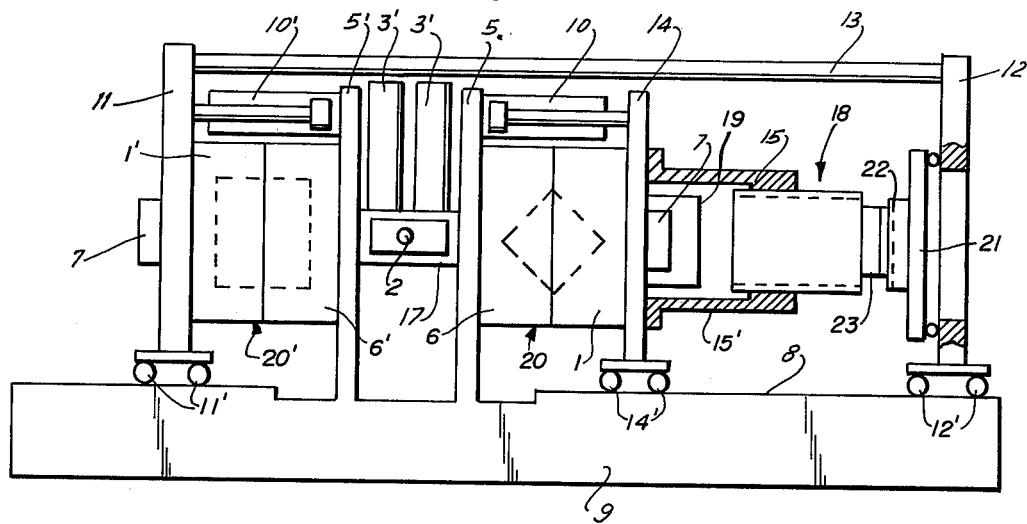
FIG. 1 is a side view of the injection molding machine with parts broken away.
Figure 2:
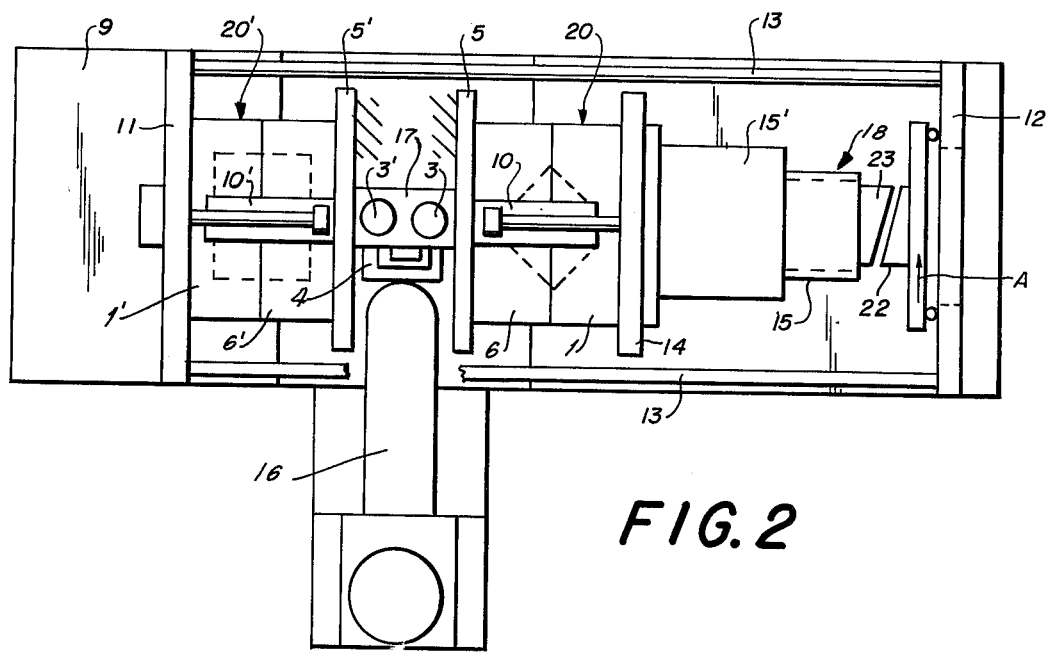
FIG. 2 is a top view of the injection molding machine shown in FIG. 1.

Referring to the drawing, the machine comprises a base 9 to which are attached the fixed plates 5,5' to which, in turn, to which there are fastened one their one side, the fixed mold halves 6,6' and between them there are disposed the injection cylinders 3,3' into which material is delivered from the feed screw barrel 16 through a nozzle 2, a feeding conduit 4 and distributor 17. One movable plate 11 and another movable middle plate 14 carry the movable mold halves 1',1 as well as the knockout cylinders 7. To the middle movable plate 14 there is fastened an adjustable slide 15, which forms part of a locking mechanism. Supporting plate 12 carries a hydraulically activated wedge-type locking mechanism 18 and is connected by means of rods 13 to the movable plate 11. The motion of the movable middle plate 14, as well as the movable plate 11 and the supporting plate 12, connected by means of rods 13, is effected over the guideways 8 of base 9 by means of displacement cylinders 10, 10' and casters 11', 12' and 14' which ride in the guideways 8.

In operation, the injection cylinders 3, 3' can be kept constantly charged with the moldable material by the feed screw barrel 16. Prior to the injection of the material into one of the molds 20, 20', both molds are drawn closed by their respective hydraulic cylinders 10, 10' and then locked in their closed position by the locking mechanism 18 which comprises a plate 21 movable in the direction of arrow A by hydraulic means not shown, the locking mechanism 18 further comprising a wedge member 22 mounted on plate 21 and engageable with another wedge member 23 mounted on slide 15, which is guided in sleeve 15' for camming the slide 15 into engagement with a boss 19 mounted on plate 14. In this position of the locking mechanism, pressure is brought to bear on plates 12 and 14, biasing them in opposite directions, the effect being that plate 14 locks mold 20, and plate 11, which is connected to plate 12 by rods 13 in a fixed spaced-apart relationship, locks mold 20' in a closed position.

With both molds in the locked condition, the one that is empty can be injected with the moldable material. At this point the locking mechanism 18 is released, so that the only force holding the molds closed comes from the injection cylinders 10, 10', allowing the mold 20 or 20', depending upon which one had been previously injected, to be opened independently to remove the molded article which had been hardening during the injection of the other mold.

What we claim is:

1. An injection molding machine for materials having a long solidification time, comprising:

a base;

support means on said base;

a first stationary mold portion on said support means;

a first plate movable on said base;

a first movable mold portion on said first plate and forming with said first stationary mold portion a first mold cavity in a closed position thereof;

a second stationary mold portion on said support means;

a second plate movable on said base;

a second movable mold portion on said second plate and forming with said second stationary mold portion a second mold cavity in a closed position thereof;

a third plate connected to said first plate and movable therewith in fixed spaced relationship on said base;

a locking mechanism between said second plate and said third plate for biasing said second and third plates in opposite directions when said first and second mold cavities are formed;

a distributor between and communicating with said first mold cavity and said second mold cavity;

a first injection cylinder on said distributor and feeding said first mold cavity therethrough;

a second injection cylinder on said distributor and feeding said second mold cavity therethrough; and a feed screw barrel communicating through said distributor with said first injection cylinder and said second injection cylinder for the charging thereof with moldable material.

2. The device as defined in claim 1, further comprising rods rigidly connecting said first and third plates.

3. The device as defined in claim 1, further comprising:
   a first hydraulic cylinder between said support means and said first plate for the displacement thereof; and
   a second hydraulic cylinder between said support means and said second plate for the displacement thereof.

4. The device as defined in claim 1 wherein said locking mechanism comprises:
   a first wedge member transversely displaceable on said third plate; and
   a second wedge member axially displaceable by said first wedge member against said second plate.

5. The device as defined in claim 1 wherein said support means comprises:
   a first stationary plate on said base and carrying said first stationary mold portion; and
   a second stationary plate on said base and carrying said second mold portion, said distributor and said injection cylinders being between said first stationary plate and said second stationary plate.

* * * * *